United States Patent
Park et al.

(10) Patent No.: US 11,458,624 B2
(45) Date of Patent: Oct. 4, 2022

(54) CONTROL SERVER AND METHOD FOR CONTROLLING ROBOT USING ARTIFICIAL NEURAL NETWORK, AND ROBOT IMPLEMENTING THE SAME

(71) Applicants: LG ELECTRONICS INC., Seoul (KR); INDUSTRY-UNIVERSITY COOPERATION FOUNDATION HANYANG UNIVERSITY, Seoul (KR)

(72) Inventors: Sung Gil Park, Seoul (KR); Byeonggil Yoo, Seoul (KR); Sungeun Chung, Seoul (KR); Il Hong Suh, Seoul (KR); Youngbin Park, Seoul (KR); Taewon Kim, Yongin-si (KR); Yeseong Park, Seoul (KR)

(73) Assignees: LG ELECTRONICS INC., Seoul (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 425 days.

(21) Appl. No.: 16/774,384

(22) Filed: Jan. 28, 2020

(65) Prior Publication Data
US 2021/0086355 A1 Mar. 25, 2021

(30) Foreign Application Priority Data
Sep. 19, 2019 (KR) .......................... 10-2019-0115578

(51) Int. Cl.
*B25J 9/16* (2006.01)
*G06K 9/62* (2022.01)
*G06N 3/08* (2006.01)

(52) U.S. Cl.
CPC ............. *B25J 9/163* (2013.01); *B25J 9/1697* (2013.01); *G06K 9/6256* (2013.01); *G06K 9/6262* (2013.01); *G06N 3/08* (2013.01)

(58) Field of Classification Search
CPC ........ G16F 16/29; G16H 50/30; G16N 5/022; G16N 3/02
See application file for complete search history.

(56) References Cited

U.S. PATENT DOCUMENTS

| | | | | |
|---|---|---|---|---|
| 6,917,856 B2* | 7/2005 | Murata | .................. | B25J 9/1674 700/165 |
| 7,054,715 B2* | 5/2006 | Takano | .................. | B25J 9/1602 700/262 |

(Continued)

*Primary Examiner* — Yosef Kassa
(74) *Attorney, Agent, or Firm* — Birch, Stewart, Kolasch & Birch, LLP

(57) ABSTRACT

Disclosed herein are a control server and method for controlling a robot using an artificial neural network, and a robot implementing the same. The robot includes a driver, a processor controlling the driver using an artificial neural network-based algorithm model, and a learning processor learning the algorithm model, where the algorithm model includes a first GAN (generative adversarial network) and a second GAN, the processor generates a plurality of real-like-fake images using a first generator included in a learned first GAN, the learning processor learns a second GAN based on a plurality of random texture rendered images and the plurality of real-like-fake images, and the processor generates a canonical image by inputting a real image to a second generator included in a learned second GAN, and controls the driver using the canonical image.

20 Claims, 14 Drawing Sheets

(56) References Cited

U.S. PATENT DOCUMENTS

| | | | | |
|---|---|---|---|---|
| 7,519,907 B2* | 4/2009 | Cohen | ................... | G06T 15/503 |
| | | | | 715/728 |
| 8,027,044 B2* | 9/2011 | Sato | ...................... | B65H 31/24 |
| | | | | 358/1.12 |
| 9,770,300 B2* | 9/2017 | Kwon | .................... | A61B 34/30 |
| 9,802,322 B2* | 10/2017 | Angle | .................... | G06Q 20/12 |

* cited by examiner

CONTROL SERVER AND METHOD FOR CONTROLLING ROBOT USING ARTIFICIAL NEURAL NETWORK, AND ROBOT IMPLEMENTING THE SAME

CROSS-REFERENCE TO RELATED APPLICATION

This application claims priority to and the benefit of Korean Patent Application No. 10-2019-0115578, filed in the Republic of Korea on Sep. 19, 2019, the disclosure of which is incorporated herein by reference in its entirety.

BACKGROUND

1. Field of the Invention

The present disclosure relates to a control server and method for controlling a robot using an artificial neural network, and a robot implementing the same.

2. Description of Related Art

Robots have been developed for industrial purposes and have played a role in automating processes in factories. In recent years, robots have been applied to a wide range of fields. Accordingly, medical robots, aerospace robots and the like have been developed including domestic robots that are used in homes. Among the robots, a robot capable of navigating automatically is referred to as a mobile robot.

In the related art, operations of a robot may be trained using an image acquired in a real environment, i.e., a real image. However, it costs a lot to acquire real images. Accordingly, in the improved related art, operations of a robot are trained through simulation. In this situation, there is a gap between a simulated environments and a real environment. To narrow the gap, domain adaptation technology is used.

A method of converting a simulated image into a real image using a GAN (generative adversarial network) for domain adaptation is disclosed in a paper titled "Using Simulation and Domain Adaptation to Improve Efficiency of Deep Robotic Grasping" published by Konstantinos Bousmalis and others.

Additionally, an RCAN (randomized-canonical adaptation network) method for converting a simulated image, in which textures are randomly rendered, into a canonical image is disclosed in a paper titled "Sim-to-Real via Sim-to-Sim: Data-efficient Robotic Grasping via Randomized-to-Canonical Adaptation Networks" published by Stephen James and others.

However, results of actual conversion of a simulated image into a canonical image using an RCAN differs from results presented in the paper.

That is, the RCAN supposes that an image acquired in a real environment (i.e., a real image) is an image in which textures are randomly rendered. However, there is a visual gap between a real image and an image in which textures are randomly rendered. Accordingly, when megabytes of image data (millions of units of image data) are not acquired, performance of the RCAN is decreased due to the visual gap at the time of performing a test.

Additionally, as described above, megabytes of training data (millions of units of training data) are required to train an RCAN. However, it takes a long time to acquire training data, and learning periods increase.

SUMMARY OF THE INVENTION

One objective of the present disclosure is to provide a control server and method for controlling operations of a robot more accurately, and a robot implementing the same, using two GANs.

Another objective of the present disclosure is to provide a control server and method for controlling a robot, and a robot implementing the same, using a small number of real images.

The invention is not limited to the above-mentioned objectives, and other objectives and advantages of the invention which are not mentioned above can be understood from the following description and can be more apparently understood from embodiments of the invention. It can be easily understood that objectives and advantages of the invention will be able to be embodied by means described in the appended claims and combinations thereof.

A robot according to an embodiment includes a driver provided with an actuator or a motor, a processor controlling the driver using an artificial neural network-based algorithm mode, and a learning processor learning the algorithm model, where the algorithm model includes a first GAN and a second GAN, the processor generates a plurality of real-like-fake images by inputting a plurality of simulated images to a first generator included in a learned first GAN, the learning processor learns a second GAN based on a plurality of random texture rendered images and the plurality of real-like-fake images, and the processor generates a canonical image by inputting a real image to a second generator included in a learned second GAN, and controls the driver using the canonical image.

A control server according to an embodiment includes a communicator communicating with a robot, a processor generating control signals for controlling the robot using an artificial neural network-based algorithm model, and a learning processor learning the algorithm model, where the communicator transmits the control signals to the robot, the algorithm model includes a first GAN and a second GAN, the processor generates a plurality of real-like fake images by inputting a plurality of simulated images to a first generator included in a learned first GAN, the learning processor learns a second GAN based on a plurality of random texture rendered images and the plurality of real-like-fake images, and the processor generates a canonical image by inputting a real image to a second generator included in the learned second GAN, and controls the robot using the canonical image.

A method of controlling operations of a robot according to an embodiment includes the processor's inputting a plurality of simulated images to a first generator included in a learned first GAN and generating a plurality of real-like-fake images, the learning processor's learning a second GAN based on a plurality of random texture rendered images and the plurality of the real-like-fake images, the processor's inputting a real image to a second generator included in the learned second GAN and generating a canonical image and controlling operations of the robot using the canonical image.

The present disclosure may control operations of a robot more accurately using two GAN s.

The present disclosure may control a robot accurately using a small number of real images.

DETAILED DESCRIPTION OF THE EMBODIMENTS

Figure 1:
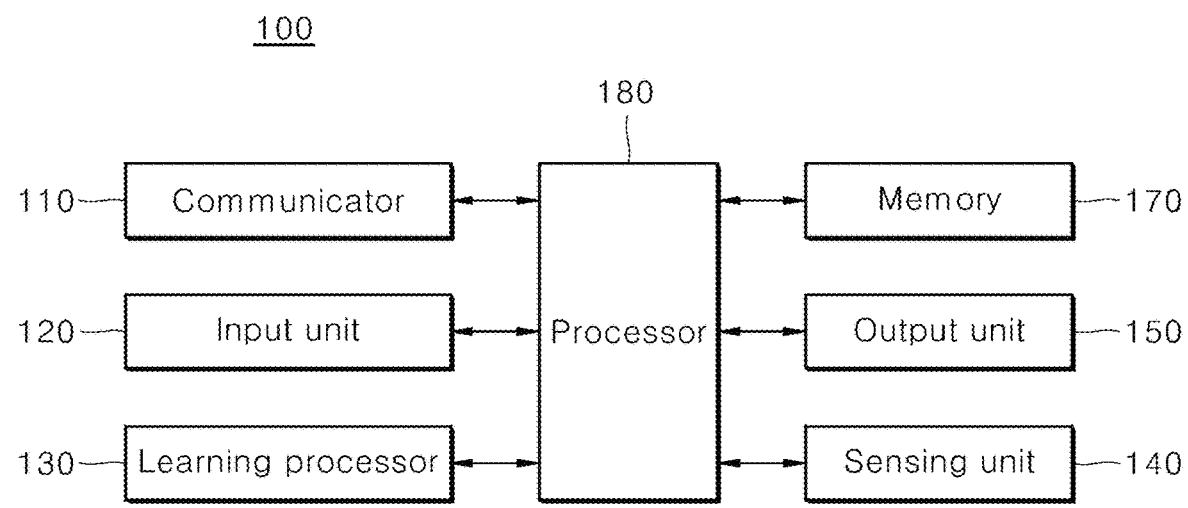
FIG. 1 is a schematic view illustrating a configuration of an AI device according to an embodiment.

Hereinafter, embodiments of the invention will be described in detail with reference to the accompanying drawings such that the invention can be easily implemented by those skilled in the art. The invention can be embodied in various forms and is not limited to the embodiments.

Parts which are not associated with description will be omitted in order to clearly describe the invention, and the same or similar elements over the entire specification will be referred to by the same reference signs. Some embodiments of the invention will be described in detail with reference to the accompanying drawings. In the drawings, the same elements will be referred to by as the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the invention. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

In embodying the invention, elements can be segmented and described for the purpose of convenience of explanation, these elements may be embodied in one device or module, or one element or may be divided and embodied into two or more devices or modules.

A robot in the present disclosure may denote a machine capable of automatically handling assignments or capable of operating, using capabilities held by the robot. Specifically, the robot that can recognize environments, can make its own decisions and can perform operations may be referred to as an intelligent robot.

Robots may be classified as industrial robots, medical robots, domestic robots, military robots and the like depending on specific purposes and fields.

They may be provided with a driver including an actuator or a motor to perform various physical operations such as movements of robot joints and the like. Additionally, mobile robots include wheels, a brake, a propeller and the like in the driver to navigate on the ground or in the air through the driver.

FIG. 1 is a schematic view illustrating a configuration of an AI device 100 according to an embodiment.

The AI device 100 may be implemented as a fixed device or a movable device and the like such as a TV set, a projector, a mobile phone, a smart phone, a desktop computer, a laptop, a digital broadcasting terminal, a personal digital assistant (PDA), a portable multimedia player (PMP), a navigator, a tablet PC, a wearable device, a set-top box (STB), a DMB receiver, a radio, a washer, a refrigerator, digital signage, a robot, a vehicle and the like.

Referring to FIG. 1, the AI device 100 may include a communicator 110, an input unit 120, a learning processor 130, a sensing unit 140, an output unit 150, a memory 170, a processor 180, and the like.

The communicator 110 may transmit data to and receive data from another AI device (100a to 100e) or external devices such as a below-described AI server 200 and the like, using wired and wireless communication technologies.

For example, the communicator 110 may transmit sensor information, user input, learning models, control signals and the like to external devices and may receive the same from external devices.

In this situation, the communicator 110 may use Global System for Mobile Communication (GSM), Code Division Multi Access (CDMA), Long Term Evolution (LTE), 5G, Wireless LAN (WLAN), Wireless-Fidelity (Wi-Fi), Bluetooth, Radio Frequency Identification (RFID), Infrared Data Association (IrDA), ZigBee, Near Field Communication (NFC), and the like, as communication technologies.

The input unit 120 may acquire various types of data.

In this situation, the input unit 120 may include a camera for inputting image signals, a microphone for receiving audio signals, and a user input unit for receiving information input by a user and the like. Herein, the camera or the microphone may be considered a sensor, and signals acquired from the camera or the microphone may be considered sensing data or sensing information.

The input unit 120 may acquire input data and the like that will be used when acquiring an output with training data and learning models for model learning. The input unit 120 may also acquire raw input data, and in this situation, the processor 180 or the learning processor 130 may extract input features as pre-processing of input data.

The learning processor 130 may train a model comprised of artificial neural networks using training data.

A learned artificial neural network may be referred to as a learning model. The learning model may be used to infer result values for new input data not for training data, and the inferred values may be used as a basis for determination to perform a certain operation.

In this situation, the learning processor 130 may perform AI processing together with a learning processor 240 of the AI server 200.

The learning process 130 may include a memory integrated into or implemented in the AI device 100, or may be implemented using a memory 170, an external memory directly coupled to the AI device 100 or a memory maintained in an external device.

The sensing unit 140 may acquire at least one of internal information on the AI device 100, surrounding environment information on the AI device 100 and user information using various sensors.

In this situation, the sensing unit 140 may include sensors such as a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, a photo sensor, a microphone, a LiDAR, a radar and the like.

The output unit 150 may perform an output operation concerning senses of sight, hearing or touch and the like.

In this situation, the output unit 150 may include a display unit outputting visual information, a speaker outputting acoustic information, a haptic module outputting tactile information and the like.

The memory 170 may store data that assists with various functions of the AI device 100. For example, the memory 170 may store input data, training data, learning models, learning history and the like, acquired by the input unit 120.

The processor 180 may determine at least one viable operation of the AI device 100 based on information determined or generated using an algorithm for data analysis or a machine learning algorithm. Additionally, the processor 180 may perform the determined operation by controlling components of the AI device 100.

To this end, the processor 180 may request, search, receive or use data of the learning processor 130 or the memory 170, and may control the components of the AI device 100 to perform a predictable operation or an operation considered to be desirable among one or more viable operations.

In this situation, the processor 180 may generate control signals for controlling an external device and may transmit the generated control signals to the external device when the processor 180 is required to connect with the external device to perform the determined operation.

The processor 180 may acquire intention information on user input, and based on the acquired intention information, may determine requirements of the user.

In this situation, the processor 180 may acquire intention information corresponding to the user input, using at least one or more of a speech-to-text (STT) engine for converting an input voice into a character string, or a natural language processing (NLP) engine for acquiring intention information on natural language.

At least one of the STT engine or the NLP engine may be comprised of artificial neural networks trained according to a machine learning algorithm. Additionally, at least one of the STT engine or the NLP engine may be an engine trained by the learning processor 130, by the learning processor 240 of the AI server 200, or by distributed data processing thereof.

The processor 180 may collect history information including a user's feedback and the like on details of operations of the AI device 100 or on operations of the AI device 100 and may store the same in the memory 170 or the learning processor 130, or may transmit the same to an external device such as the AI server 200 and the like. The collected history information may be used to update a learning model.

The processor 180 may control at least part of the components of the AI device 100 to drive an application program stored in the memory 170. Further, the processor 180 may operate two or more of the components included in the AI device 100 by combining the two or more components to drive an application program.

Figure 2:
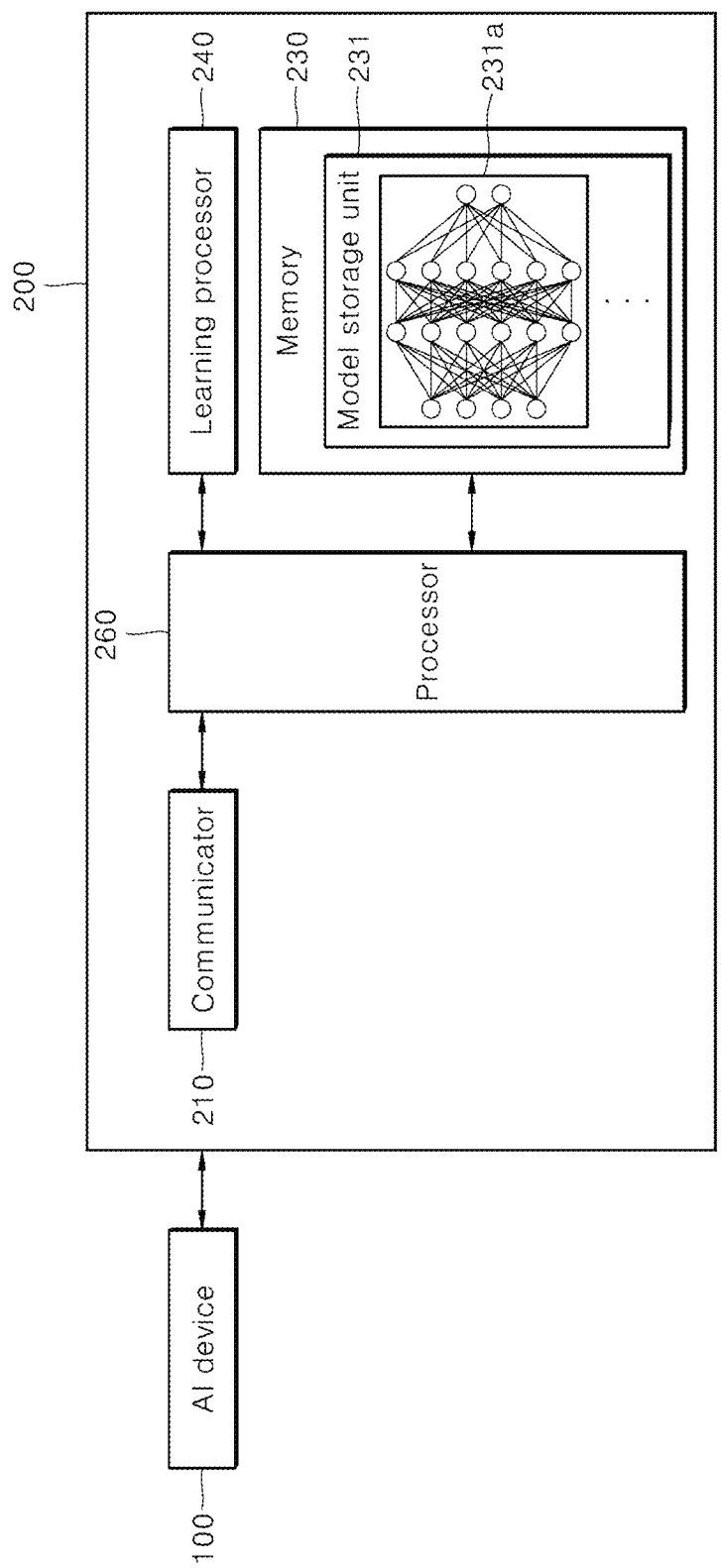
FIG. 2 is a schematic view illustrating a configuration of an AI server according to an embodiment.

FIG. 2 is a schematic view illustrating a configuration of an AI server 200 according to an embodiment.

Referring to FIG. 2, the AI server 200 may denote a device that trains an artificial neural network using a machine learning algorithm or a device that uses a trained artificial neural network.

The AI server 200 may be comprised of a plurality of servers to perform distributed data processing, and may be defined as a 5G network. In this situation, the AI server 200 may be included in the AI device 100 as a component and may be perform at least part of AI processing together with the AI device 100.

The AI server 200 may include a communicator 210, a memory 230, a learning processor 240 and a processor 260 and the like.

The communicator 210 may transmit data to and receive data from an external device such as the AI device 100 and the like.

The memory 230 may include a model storage unit 231. The model storage unit 231 may store a model (or an artificial neural network, 231a) that is being trained or is trained through the learning processor 240.

The learning processor 240 may train the artificial neural network 231a using training data. A learning model may be used in the state of being mounted onto the AI server 200 of an artificial neural network or may be used in the state of being mounted on an external device such as the AI device 100 and the like.

The learning model may be implemented as hardware, software, or a combination of hardware and software. When all or part of the learning model is implemented as software, one or more instructions constituting the learning model may be stored in the memory 230.

The processor 260 may infer result values with respect to new input data using the learning model, and may generate responses or control instructions based on the inferred result values.

The above-described AI device 210 and AI server 220 may be applied to details that are provided hereunder in the present disclosure, and may be supplemented to specify or clarify technical features of methods presented in the present disclosure.

Figure 3:
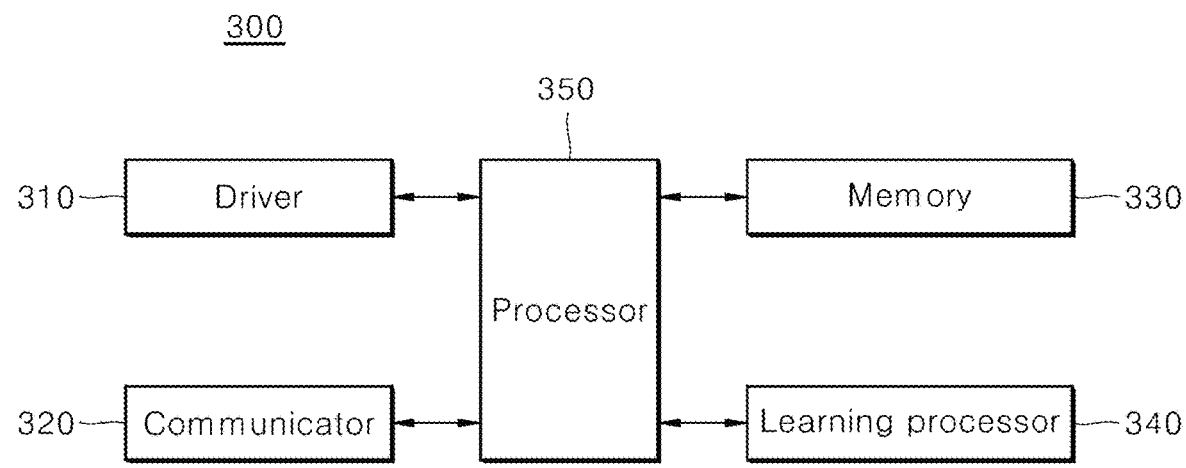
FIG. 3 is a schematic view illustrating a configuration of a robot according to an embodiment.

FIG. 3 is a schematic view illustrating a configuration of a robot 300 according to an embodiment.

Referring to FIG. 3, the robot 300 includes a driver 310, a communicator 320, a memory 330, a learning processor 340, and a processor 350.

Below, functions of each component are specifically described.

The driver 310 may include an actuator, a motor and the like, and may correspond to a robot arm that includes robot joints. The robot arm may perform the operation of grasping objects in a space.

The communicator 320 communicates with an external device.

In this situation, the communicator 320 may use Global System for Mobile Communication (GSM), Code Division Multi Access (CDMA), Long Term Evolution (LTE), 5G, Wireless LAN (WLAN), Wireless-Fidelity (Wi-Fi), Bluetooth, Radio Frequency Identification (RFID), Infrared Data Association (IrDA), ZigBee, Near Field Communication (NFC), and the like, as communication technologies.

The memory 330 may be volatile and/or non-volatile memory, and may store an instruction or data in relation to at least one of other components of the robot 300. Specifically, the memory 330 stores an artificial neural network-based algorithm model used to control the driver of the robot 100. The artificial neural network-based algorithm model includes a first GAN and a second GAN.

The learning processor 340 performs the function of learning the artificial neural network-based algorithm model.

The processor 350 may include one or more of a central processing unit, an application processor or a communication processor. For example, the processor 350 may perform calculation or data processing in relation to control and/or communication of at least one of other components of the robot 300. Specifically, the processor 350 may execute an instruction in relation to execution of a computer program, and may control the driver 310 using the artificial neural network-based algorithm model.

Below, the artificial neural network-based algorithm is briefly described, and then operations of the learning processor 330 and the processor 350 that control the driver 310 are specifically described.

Artificial intelligence (AI) involves an area that studies artificial intelligence or methodologies of developing artificial intelligence, and machine learning involves an area that defines a variety of problems handled in the artificial intelligence field and that studies methodologies of solving the problems. Machine learning is also defined as an algorithm for enhancing performance concerning a job through steady experience.

An artificial neural network (ANN), which is a model used in machine learning, may denote a model that is comprised of artificial neurons (nodes) forming a network through a connection of synapses and that has the ability to solve problems, as a whole. The artificial neural network may be defined by a pattern of a connection between neurons of other layers, a learning process of updating model parameters, and an activation function generating an output value.

The artificial neural network may include an input layer, an output layer, and optionally one or more hidden layers. Each layer may include one or more neurons, and the artificial neural network may include synapses connecting a neuron and a neuron. In the artificial neural network, each neuron may output input signals input through synapses, weights, and values of an activation function of biases.

A model parameter may denote a parameter determined through learning, and may include weights of connections of synapses, biases of neurons, and the like. Additionally, a hyperparameter denotes a parameter that is required to be set prior to learning in a machine learning algorithm, and includes a learning rate, repetition frequency, a size of mini-batch, an initialization function, and the like.

The purpose of learning an artificial neural network is to determine a model parameter that minimizes a loss function. The loss function may be used as an index for determining an optimal model parameter in the process of learning the artificial neural network.

Machine learning may be classified as supervised learning, unsupervised learning, and reinforcement learning based on learning methods.

Supervised learning may involve a method of training an artificial neural network in the state in which a label is given to training data, and a label may denote the correct answer (or result values) that has to be inferred by an artificial neural network when training data is input to the artificial neural network.

Unsupervised learning may involve a method of training an artificial neural network in the state in which a label is not given to training data.

Reinforcement learning may involve a method of training an agent defined in a certain environment such that the agent chooses a behavior for maximizing a cumulative reward or the order of behaviors for maximizing a cumulative reward in each state.

Among artificial neural networks, machine learning implemented as a deep neural network (DNN) including a plurality of hidden layers is also referred to as deep learning, and deep learning is part of machine learning. Below, machine learning includes deep learning.

Figure 4:
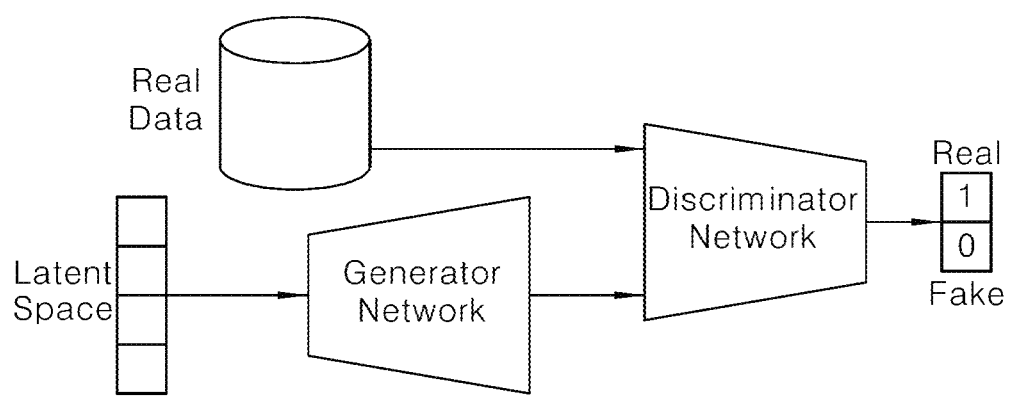
FIG. 4 is a view illustrating a structure of a GAN according to an embodiment.

A GAN (generative adversarial network) is a relatively new architecture of machine learning for a neural network. FIG. 4 shows a structure of the GAN.

The GAN belongs to part of unsupervised learning in machine learning, and is a new type of generative model used for generating an image. The concept of GAN involves introducing a discriminator network and learning a generator network. The term "adversarial" denotes a contest between two networks, i.e., a mutual contest between a generator and a discriminator.

As illustrated in FIG. 4, while a generator attempts to create a more realistic image to deceive a discriminator, the discriminator continues to adjust a parameter to distinguish between an image generated by the generator and a real image. From a game theory perspective, the generator and the discriminator contest with each other in a zero-sum game.

Figure 5:
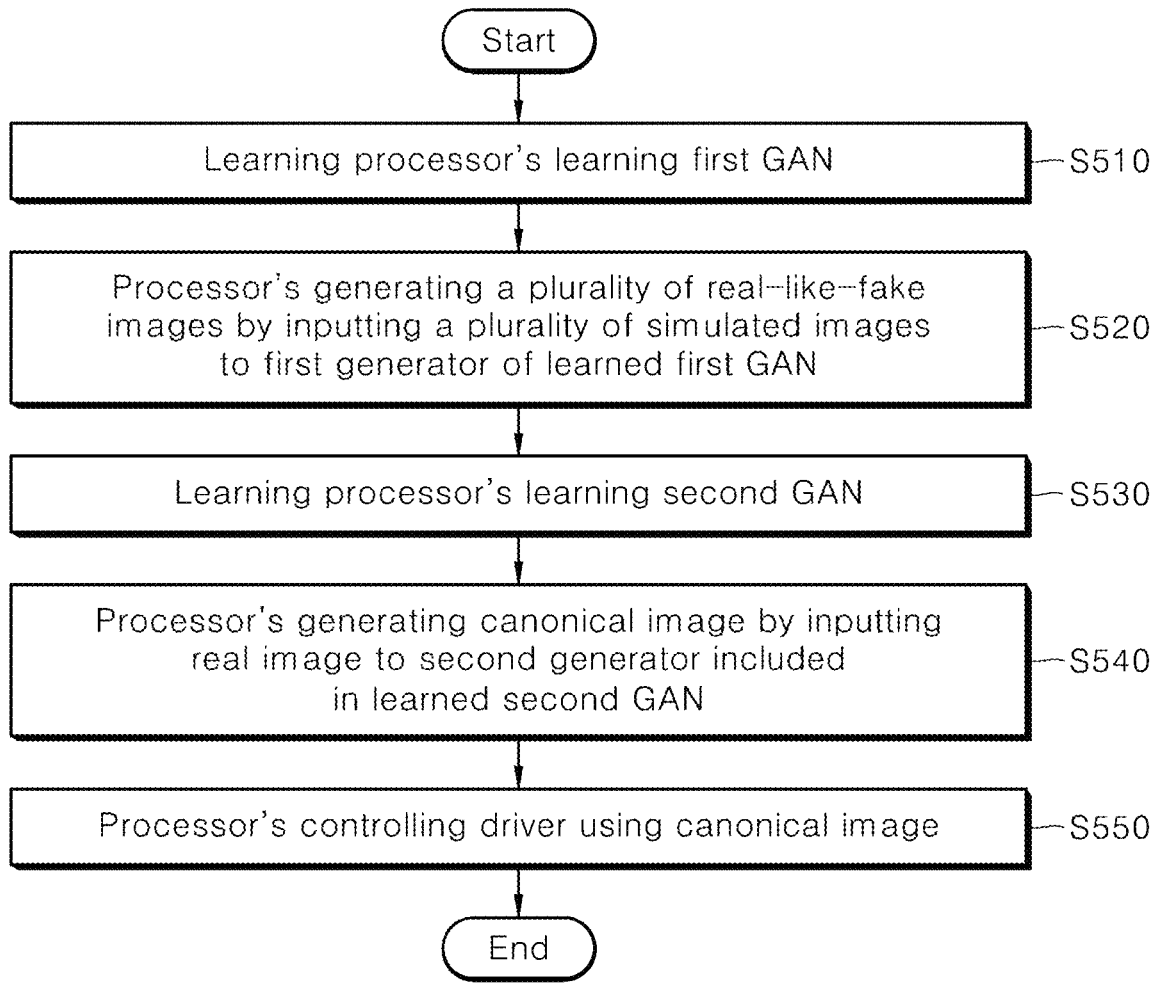
FIG. 5 is a flow chart illustrating a method of controlling a robot according to an embodiment.

FIG. 5 is a flow chart illustrating a method of controlling a robot 300 according to an embodiment.

Figure 6:
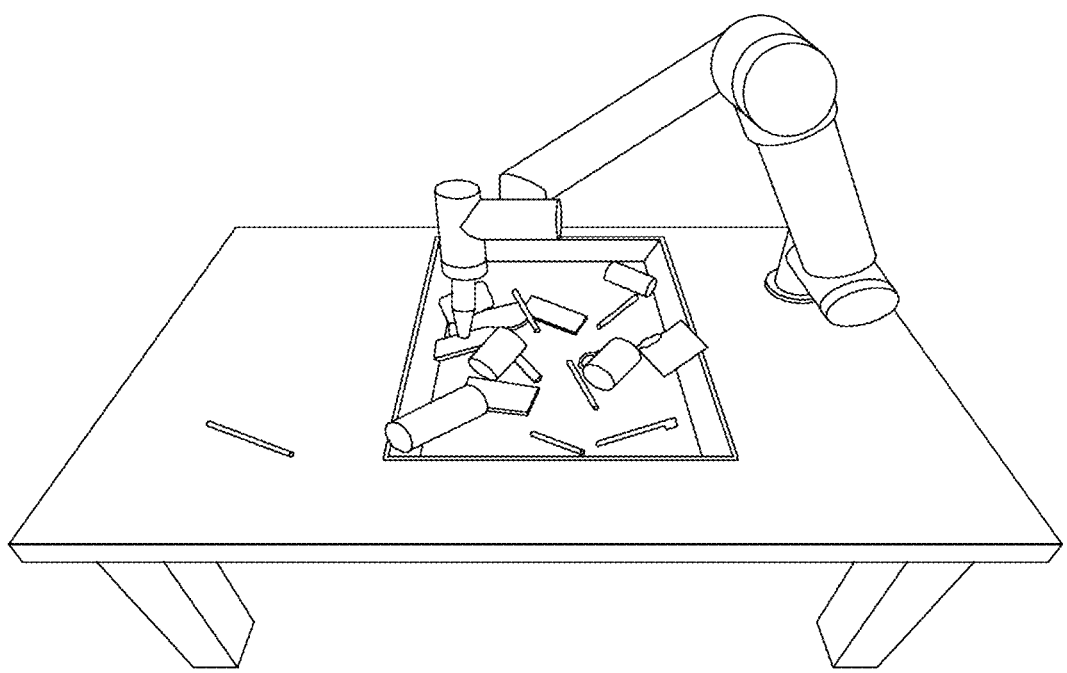
FIG. 6 is a view for describing a concept of training operations of a robot, which is performed in the method of FIG. 5 according to an embodiment.

The present disclosure trains operations of the robot 300 in simulated environments as in FIG. 6 to control operations of the robot 300 in a real environment.

Below, operations in each step are described.

First, in step 510, a learning processor 330 learns a first GAN. The first GAN includes a first generator and a first discriminator.

According to an embodiment, training data for learning the first GAN may include a plurality of training simulated images and a plurality of training real images.

Specifically, the learning processor 330 performs a plurality of first learning operations to learn the first GAN. That is, in step 510, a plurality of steps of carrying out first learning are performed.

Figure 7:
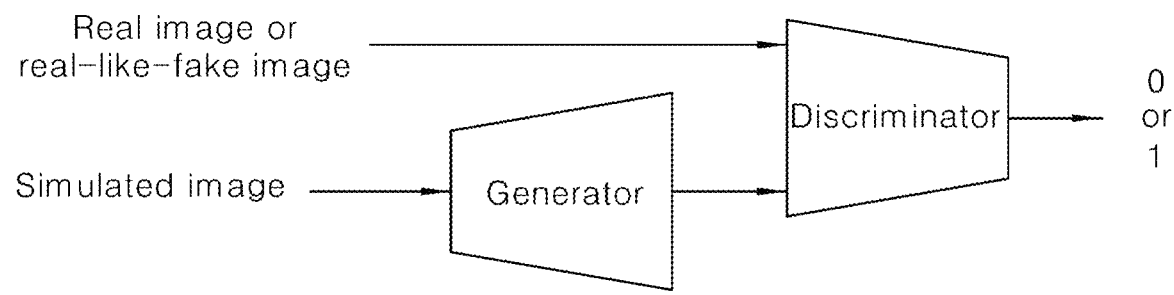
FIGS. 7 and 9 are views for describing a concept of a structure of a GAN according to an embodiment.

Herein, in each of the plurality of first learning operations, a training simulated image is input to an input layer of the first generator, a real-like-fake image is output to an output layer of the first generator, the real-like-fake image output in the first generator and a first image are input to an input layer of the first discriminator, and results of discrimination are output to an output layer of the first discriminator, as in FIG. 7.

Below, each image is specifically described as follows.

A real image is an image acquired through an image acquisition device such as a camera and the like in a real environment.

The training simulated image, which is a simulated image used for learning, is generated by an additional simulator. When the robot 300 performs the operation of grasping objects in a space, the simulated image denotes an image in which an index is given to each of the objects in the space, and denotes an image which is generated through a computer program and the like using location information and the like of the objects.

The real-like-fake image denotes a fake image that is almost similar to a real image which is an image acquired in a real environment.

Figure 8A:
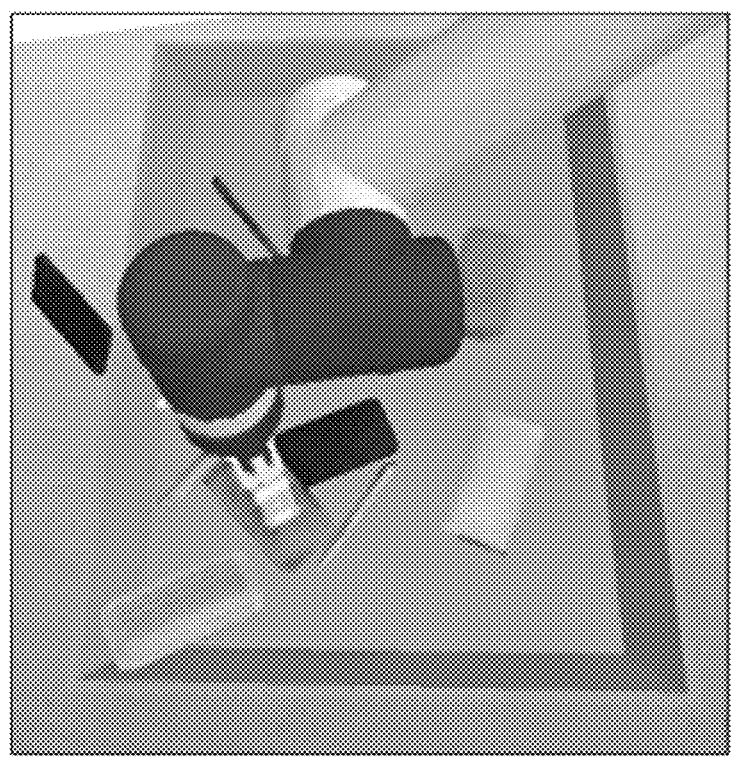
FIGS. 8A, 8B, 10A, 10B and 10C are views illustrating an example of images according to embodiments in the present disclosure.
Figure 8B:
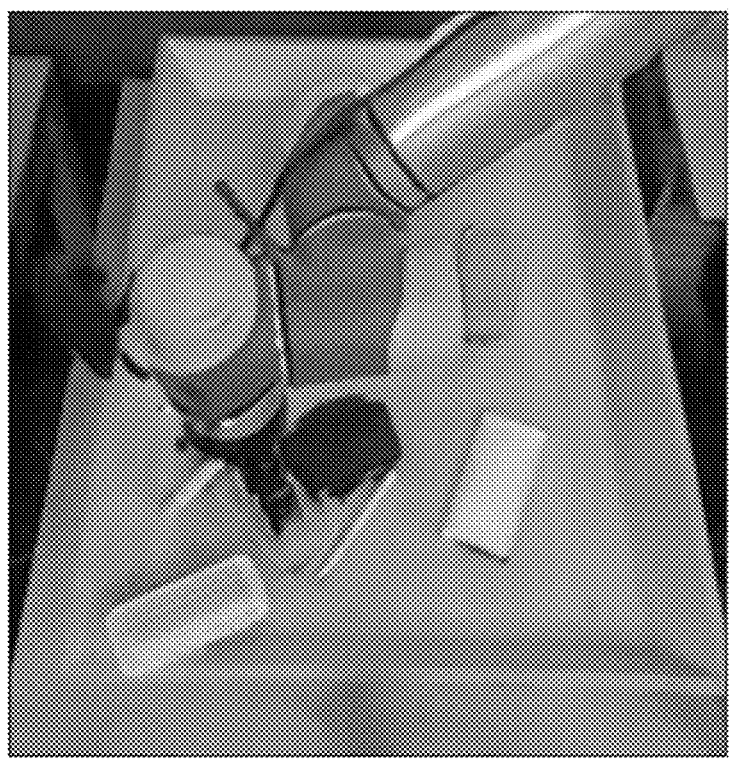

FIG. 8A shows an example of a simulated image, and (FIG. 8B shows an example of a real-like-fake image output in the first generator. Refer to details on the simulated image and the real-like-fake image in a paper titled "dual generative adversarial neural network-based domain adaptation technology for real-world robot manipulation learning" published by this inventor.

Additionally, the first image is any one of a real image acquired in a real environment and a previous real-like-fake image output in the first generator in a previous step of carrying out first learning. That is, a real image or a previous real-like-fake image may be input to the input layer of the first discriminator.

The first discriminator outputs value 0 or value 1. The output value varies according to two images input to the input layer of the first discriminator.

In short, the first GAN performs learning using a simulated image and a real image. The first generator generates a real-like-fake image from the simulated image, and the first discriminator distinguishes between the real-like-fake image and the real image.

Next, in step 520, a processor 350 generates a plurality of real-like-fake images by inputting a plurality of simulated images to the first generator of the learned first GAN. In this situation, the plurality of simulated images are input to the first generator consecutively, and accordingly, the plurality of real-like-fake images are output in the first generator consecutively.

Next, in step 530, the learning processor 330 learns a second GAN. The second GAN includes a second generator and a second discriminator.

According to an embodiment, training data for learning the second GAN may include a plurality of random texture rendered images and a plurality of real-like-fake images. In this situation, the plurality of real-like-fake images are images input in the first generator of the learned first GAN, which are described above.

Specifically, the learning processor 330 performs a plurality of second learning operations to learn the second GAN. That is, in step 530, a plurality of steps of carrying out second learning are performed.

Figure 9:
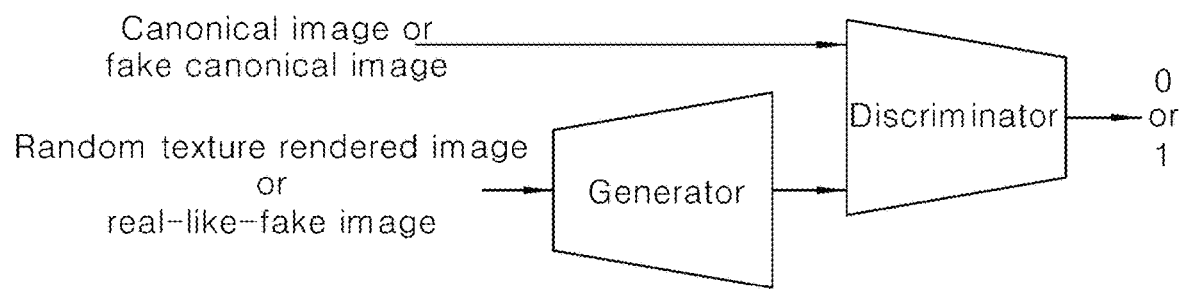

Herein, in each of the plurality of second learning operations, any one of the random texture rendered image, or the real-like-fake image generated in the first generator is input to an input layer of the second generator, a fake canonical image is output to an output layer of the second generator, the fake canonical image output in the second generator and a second image are input to an input layer of the second discriminator, and results of discrimination are output to an output layer of the second discriminator, as in FIG. 9.

Below, each image is specifically described as follows.

Figure 10A:
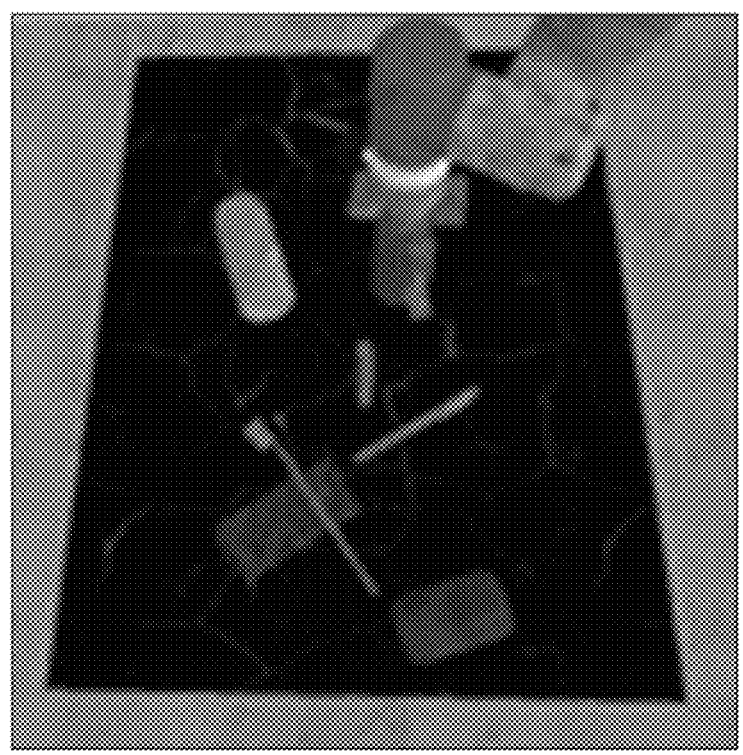

The random texture rendered image is an image in which textures of a simulated image generated by a simulator are randomly rendered, as in FIG. 10A.

Figure 10B:
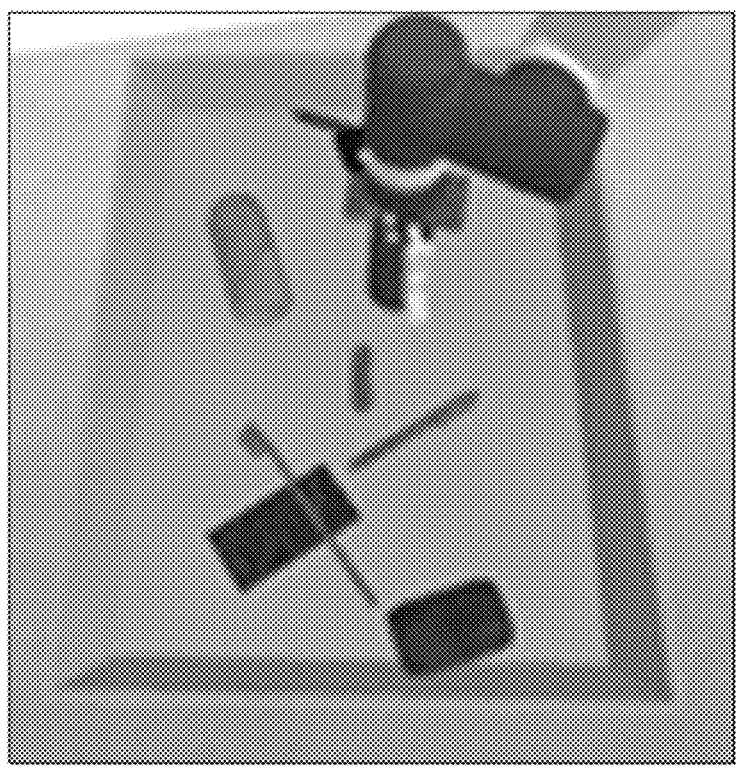

A canonical image denotes an image in which colors of joints of a robot arm are different from those of other components in a simulated image including the robot arm, as in FIG. 10B.

Additionally, the fake canonical image denotes a fake image similar to a canonical image.

Refer to details on the random texture rendered image and the canonical image in a paper titled "dual generative adversarial neural network-based domain adaptation technology for real-world robot manipulation learning" published by this inventor.

The second image is any one of a canonical image and a previous fake canonical image output in the second generator in a previous step of carrying out second learning. That is, a canonical image or a previous fake canonical image may be input to the input layer of the second discriminator.

The second discriminator outputs value 0 or value 1. The output value varies according to two images input to the input layer of the second discriminator.

In short, the second GAN performs learning using a real-like fake image output through the first generator as well as a random texture rendered image. The second generator generates a fake canonical image, and the second discriminator distinguishes between the fake canonical image and the canonical image.

Figure 10C:
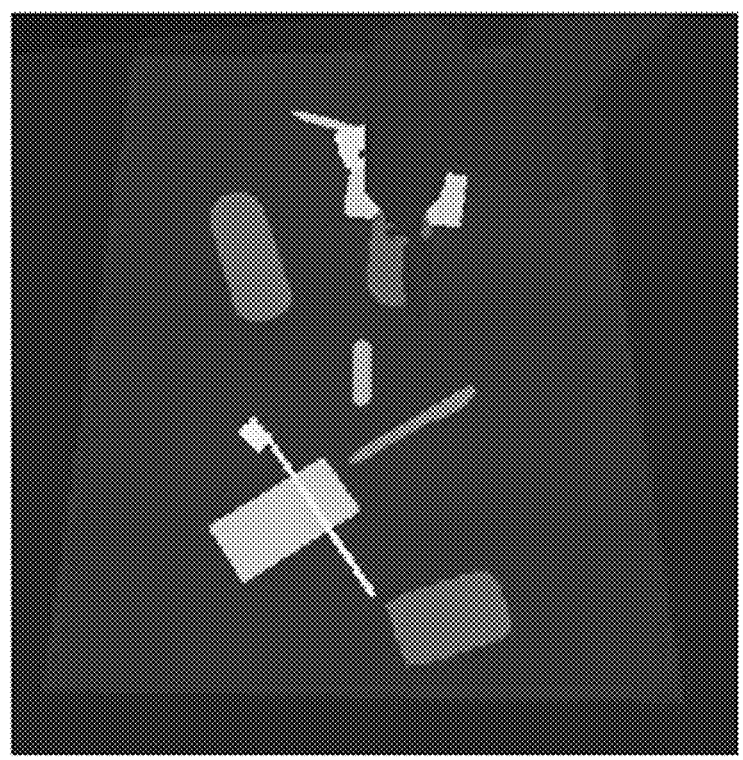

The second generator may further output a segmented image. The segmented image denotes an image in which objects in an image are segmented meaningfully and is used to adjust a parameter of the second generator, as FIG. 10C.

Refer to details on the segmented image in a paper titled "dual generative adversarial neural network-based domain adaptation technology for real-world robot manipulation learning" published by this inventor.

Then in step 540, the processor 350 generates a canonical image by inputting a real image to the second generator included in the learned second GAN. Additionally, in step 550, the processor 350 controls a driver 310 using the canonical image.

That is, steps 540 and 550 are to control the driver 310, and the processor 350 outputs a canonical image by inputting a real image to the second generator that completed learning, and controls an actual driver 310, i.e., a robot arm using the output canonical image.

Characteristic configurations of the present disclosure are described as follows.

The RCAN mentioned in the background art is a learning model to learn how to convert an image, in which textures are randomly rendered, into a canonical image that is not randomized, in a simulated environments, and a learning model in which rdomain randomization and a GAN are combined. Herein, the generator receives the image in which textures are randomly rendered and generates a canonical image, and the discriminator performs learning, while distinguishing between the canonical image and a canonical label image that is training data.

The RCAN supposes that an image acquired in a real environment is also one of the images in which textures are randomly rendered. However, there is a visual gap between an image acquired in a real environment and an image in which textures are randomly rendered. Accordingly, when several million units of data are not acquired, performance of the RCAN is decreased due to the visual gap at the time of performing a test. Additionally, it takes a long time to acquire training data, and learning periods increase.

According to the present disclosure, two GANs are used to solve the above-described problems, and thus, may achieve performance similar to the performance of a conventional RCAN using a relatively small number of data.

That is, the present disclosure trains the second GAN by further using a real-like-fake image as well as an image in which textures are randomly rendered. Even when a real image is input to control operations of the robot 300 actually, the operations of the robot 300 may be controlled more accurately in the situation in which the real-like-fake image is used to learn the second GAN.

Additionally, the first GAN may be used to generate a real-like-fake image. In this situation, real image data may be used for learning. However, when the first GAN is used to generate a real-like-fake image, the number of image data, used for learning operations of the robot 300 with real data, is smaller than the number of real image data.

Figure 11:
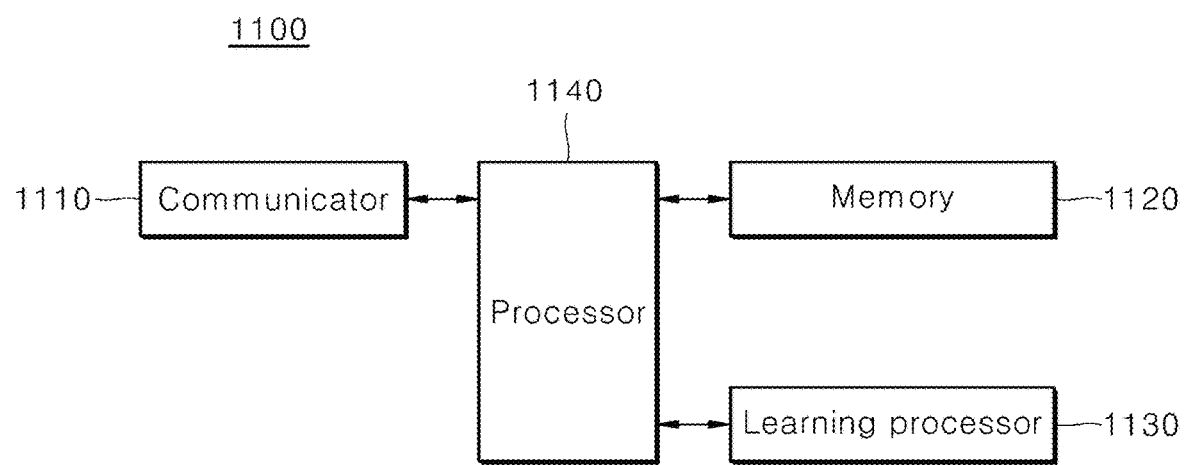
FIG. 11 is a schematic view illustrating a configuration of a control server according to an embodiment.

FIG. 11 is a schematic view illustrating a configuration of a control server according to an embodiment.

Referring to FIG. 11, the control server 1100 may be an AI server and may include a communicator 1110, a memory 1120, a learning processor 1130, and a processor 1140.

The communicator 1110 communicates with a robot. As an example, the communicator 1110 may transmit a below-described signal for controlling the robot to the robot.

In this situation, the communicator 1110 may communicate with the robot using a 5G network.

According to an embodiment, a process of communication connection between the communicator 1110 and the robot through a 5G network includes an initial access process, an arbitrary access process and a process of transmitting and receiving a UL grant, a process of transmitting and receiving a DL grant, and the communicator 1110 may perform the process of communication connection and then may transmit a control signal to the robot.

The memory 1120 may be volatile and/or non-volatile memory, and may store an instruction or data in relation to at least one of other components of the control server 1100. Specifically, the memory 1120 stores an artificial neural network-based algorithm model used to control the robot. The artificial neural network-based algorithm model includes a first GAN and a second GAN.

The learning processor 1130 performs the function of learning the artificial neural network-based algorithm model.

The processor 1140 may include one or more of a central processing unit, an application processor, or a communication processor. Specifically, the processor 350 may execute an instruction in relation to execution of a computer program, and may generate a signal for controlling the robot using the artificial neural network-based algorithm model.

Operations of the learning processor 1130 and the processor 1140 are similar to those of the learning processor 330 and the processor 350 in FIG. 3 described above. Accordingly, detailed description is omitted.

In short, the control server 1100 may perform the function of controlling the robot including a robot arm, and the robot may not include a learning processor, and may include a processor that performs only simple calculation for driving the robot arm. The control server 1100 may generate a canonical image using two GANs, and may generate control signals for controlling the robot using the canonical image.

When all elements of the embodiments of the invention are described to be combined into one element or to operate in combination, the invention is not limited to the embodiments and all the elements may be selectively combined to operate within the scope of the invention. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the invention can be realized. Examples of a storage medium having stored the computer program include storage mediums such as a magnetic recording medium, an optical recording medium, and a semiconductor recording medium. The computer program for realizing the embodiments of the invention includes a program module which is transmitted via an external device in real time.

While embodiments of the invention have been described above, various changes or modifications can be made thereon by those skilled in the art. Accordingly, it should be understood that such changes and modifications belong to the scope of the invention without departing from the scope of the invention.

What is claimed is:

1. A robot, comprising:
    a driver including an actuator or a motor;
    a learning processor configured to:
        learn an artificial neural network-based algorithm model including a first generative adversarial network (GAN) and a second GAN, the second GAN being based on a plurality of random texture rendered images and a plurality of real-like-fake images; and
    a processor configured to:
        control the driver based on the artificial neural network-based algorithm model, generate the plurality of real-like-fake images by inputting a plurality of simulated images to a first generator included in the first GAN,
        generate a canonical image by inputting a real image to a second generator included in the second GAN, and
        control the driver based on the canonical image.

2. The robot of claim 1, wherein the real-like-fake image is a fake image similar in appearance to an image acquired in a real environment.

3. The robot of claim 1, wherein the learning processor learns the first GAN based on training data including a plurality of training simulated images and a plurality of training real images.

4. The robot of claim 3, wherein the learning processor is further configured to:
    perform a plurality of first learning operations to learn the first GAN,
    wherein, in each of the plurality of first learning operations, one of the plurality of training simulated images is input to an input layer of the first generator,
    a real-like-fake image is output to an output layer of the first generator,
    the real-like-fake image output to the first generator and a first image are input to an input layer of a first discriminator included in the first GAN, and
    a result of discrimination between the real-like-fake image and the first image is output to an output layer of the first discriminator, and
    wherein the first image is a real image or a previous real-like-fake image output by the first generator in a previous step of carrying out one of the plurality of first learning operations.

5. The robot of claim 1, wherein the learning processor is further configured to:
    perform a plurality of second learning operations to learn the second GAN,
    wherein, in each of the plurality of second learning operations, a random texture rendered image or a real-like-fake image generated by the first generator is input to an input layer of the second generator,
    a fake canonical image is output to an output layer of the second generator,
    the fake canonical image output by the second generator and a second image are input to an input layer of a second discriminator included in the second GAN, and
    a result of discrimination between the fake canonical image and the second image is output to an output layer of the second discriminator, and
    wherein the second image is a canonical image or a previous fake canonical image output by the second generator in a previous step of carrying out one of the plurality of second learning operations.

6. The robot of claim 5, wherein the fake canonical image is a fake canonical image similar to a canonical image.

7. A control server comprising:
a communicator configured to communicate with a robot;
a learning processor configured to:
  learn an artificial neural network-based algorithm model including a first generative adversarial network (GAN) and a second GAN, the second GAN being based on a plurality of random texture rendered images and a plurality of real-like-fake images; and
a processor configured to:
  generate control signals for controlling the robot based on the artificial neural network-based algorithm model and transmit the control signals to the robot via the communicator,
  generate the plurality of real-like-fake images by inputting a plurality of simulated images to a first generator included in the first GAN,
  generate a canonical image by inputting a real image to a second generator included in the second GAN, and
  control the robot based on the canonical image.

8. The control server of claim 7, wherein the communicator transmits the control signals to the robot through a 5G network.

9. The control server of claim 7, wherein the real-like-fake image is a fake image similar in appearance to an image acquired in a real environment.

10. The control server of claim 7, wherein the learning processor learns the first GAN based on training data including a plurality of training simulated images and a plurality of training real images.

11. The control server of claim 10, wherein the learning processor is further configured to:
perform a plurality of first learning operations to learn the first GAN,
wherein, in each of the plurality of first learning operations, one of the plurality of training simulated images is input to an input layer of the first generator,
a real-like-fake image is output to an output layer of the first generator,
the real-like-fake image output to the first generator and a first image are input to an input layer of a first discriminator included in the first GAN, and
a result of discrimination between the real-like-fake image and the first image is output to an output layer of the first discriminator, and
wherein the first image is a real image or a previous real-like-fake image output by the first generator in a previous step of carrying out one of the plurality of first learning operations.

12. The control server of claim 7, wherein the learning processor is further configured to:
perform a plurality of second learning operations to learn the second GAN,
wherein, in each of the plurality of second learning operations, a random texture rendered image or a real-like-fake image generated by the first generator is input to an input layer of the second generator,
a fake canonical image is output to an output layer of the second generator,
the fake canonical image output by the second generator and a second image are input to an input layer of a second discriminator included in the second GAN, and
a result of discrimination between the fake canonical image and the second image is output to an output layer of the second discriminator, and
wherein the second image is a canonical image or a previous fake canonical image output by the second generator in a previous step of carrying out one of the plurality of second learning operations.

13. The control server of claim 12, wherein the fake canonical image is a fake canonical image similar to a canonical image.

14. A method of controlling operations of a robot, which are performed in a device including a learning processor and a processor, the method comprising:
inputting, by the processor, a plurality of simulated images to a first generator included in a first generative adversarial network (GAN) to generate a plurality of real-like-fake images;
learning, by the learning processor, a second GAN based on a plurality of random texture rendered images and the plurality of the real-like-fake images;
inputting, by the processor, a real image to a second generator included in the second GAN to generate a canonical image; and
controlling, by the processor, operations of the robot based on the canonical image.

15. The method of claim 14, wherein the real-like-fake image is a fake image similar in appearance to an image acquired in a real environment.

16. The method of claim 14, further comprising:
before generating the plurality of the real-like-fake images, learning, by the learning processor, the first GAN,
wherein training data for learning the first GAN includes a plurality of training simulated images and a plurality of training real images.

17. The method of claim 16, further comprising:
performing, by the learning processor, a plurality of first learning operations to learn the first GAN,
wherein, in each of the plurality of first learning operations,
one of the plurality of training simulated images is input to an input layer of the first generator,
a real-like-fake image is output to an output layer of the first generator,
the real-like-fake image output to the first generator and a first image are input to an input layer of a first discriminator included in the first GAN, and
a result of discrimination between the real-like-fake image and the first image is output to an output layer of the first discriminator, and
wherein the first image is a real image or a previous real-like-fake image output by the first generator in a previous step of carrying out one of the plurality of first learning operations.

18. The method of claim 14, further comprising:
performing, by the learning processor, a plurality of second learning operations to learn the second GAN;
wherein, in each of the plurality of second learning operations, a random texture rendered image or a real-like-fake image generated by the first generator is input to an input layer of the second generator,
a fake canonical image is output to an output layer of the second generator,
the fake canonical image output by the second generator and a second image are input to an input layer of a second discriminator included in the second GAN, and a result of discrimination between the fake canonical image and the second image is output to an output layer of the second discriminator, and wherein the second image is a canonical image or a previous fake canonical image output by the second generator in a previous step of carrying out one of the plurality of second learning operations.

19. The method of claim 18, wherein the fake canonical image is a fake canonical image similar to a canonical image.

20. The method of claim 14, wherein the robot is controlled by the processor with control signals transmitted via a 5G network.

* * * * *